(12) United States Patent
Wipplinger et al.

(10) Patent No.: US 7,756,637 B2
(45) Date of Patent: Jul. 13, 2010

(54) METHODS AND SYSTEMS FOR DISPLAYING ELECTRONIC ENROUTE MAPS

(75) Inventors: Patrick Ralf Wipplinger, Moerfelden-Walldorf (DE); Richard William Ellerbrock, Highlands Ranch, CO (US)

(73) Assignee: The Boeing Company, Chicago, IL (US)

( * ) Notice: Subject to any disclaimer, the term of this patent is extended or adjusted under 35 U.S.C. 154(b) by 102 days.

(21) Appl. No.: 11/614,452

(22) Filed: Dec. 21, 2006

(65) Prior Publication Data

US 2008/0154442 A1 Jun. 26, 2008

(51) Int. Cl.
*G01C 21/32* (2006.01)
(52) U.S. Cl. .............................. 701/211; 701/4; 701/14; 701/16; 701/301; 340/995.26; 340/945; 340/963; 340/964; 340/965; 340/966; 340/967; 340/968; 340/969; 340/970; 340/971; 340/972; 340/973; 340/976; 340/977; 340/979; 340/995.1; 342/29; 342/30; 342/31; 342/32; 244/183; 244/184; 244/185; 244/186; 244/187; 244/188; 244/189
(58) Field of Classification Search .............. 701/4, 701/14, 16, 211, 301; 340/995.26, 945, 971, 340/972, 973, 976, 995, 963, 964, 965, 966, 340/967, 968, 969, 970, 977, 979, 995.1; 342/29, 30, 31, 32; 244/183, 184, 185, 186–189
See application file for complete search history.

(56) References Cited

U.S. PATENT DOCUMENTS

| 3,652,836 | A | * | 3/1972 | Richardson et al. | 701/203 |
|---|---|---|---|---|---|
| 3,689,741 | A | * | 9/1972 | Sjoberg et al. | 235/402 |
| 3,696,671 | A | * | 10/1972 | Steigleder et al. | 73/178 R |
| 3,750,166 | A | * | 7/1973 | Dearth | 342/30 |
| 3,899,662 | A | * | 8/1975 | Kreeger et al. | 345/619 |
| 4,078,317 | A | * | 3/1978 | Wheatley et al. | 434/43 |
| 4,454,496 | A | * | 6/1984 | Lowe | 340/980 |
| 4,692,869 | A | * | 9/1987 | King et al. | 701/206 |
| 4,792,906 | A | * | 12/1988 | King et al. | 701/5 |
| 4,796,190 | A | * | 1/1989 | Cummings | 701/200 |
| 4,825,374 | A | * | 4/1989 | King et al. | 701/5 |
| 4,994,974 | A | * | 2/1991 | Cummings | 701/200 |
| 4,999,780 | A | * | 3/1991 | Mitchell | 701/16 |
| 5,111,400 | A | | 5/1992 | Yoder | |
| 5,202,690 | A | * | 4/1993 | Frederick | 342/26 B |
| 5,353,022 | A | * | 10/1994 | Middleton et al. | 340/959 |
| 5,448,233 | A | * | 9/1995 | Saban et al. | 340/963 |
| 5,732,384 | A | * | 3/1998 | Ellert et al. | 701/120 |
| 5,820,080 | A | * | 10/1998 | Eschenbach | 244/183 |
| 5,936,552 | A | * | 8/1999 | Wichgers et al. | 340/963 |
| 5,977,990 | A | * | 11/1999 | Kowalski | 345/506 |
| 5,978,715 | A | * | 11/1999 | Briffe et al. | 701/11 |
| 6,038,498 | A | * | 3/2000 | Briffe et al. | 701/3 |
| 6,043,756 | A | * | 3/2000 | Bateman et al. | 340/945 |

(Continued)

*Primary Examiner*—Khoi Tran
*Assistant Examiner*—Jorge O Peche
(74) *Attorney, Agent, or Firm*—Armstrong Teasdale LLP

(57) ABSTRACT

Methods and systems for a position indicating display system for an aircraft are provided. The system includes a map display unit configured to display a map representative of an area being traversed by the aircraft, and an overlay comprising an own ship depiction, said overlay displayed on the map for a period of time in response to an input from at least one of a user and an aircraft sensor.

13 Claims, 3 Drawing Sheets

U.S. PATENT DOCUMENTS

| | | | |
|---|---|---|---|
| 6,112,141 A * | 8/2000 | Briffe et al. | 701/14 |
| 6,216,065 B1 * | 4/2001 | Hall et al. | 701/16 |
| 6,389,355 B1 * | 5/2002 | Gibbs et al. | 701/206 |
| 6,473,003 B2 * | 10/2002 | Horvath et al. | 340/945 |
| 6,484,071 B1 * | 11/2002 | Conner et al. | 701/9 |
| 6,567,014 B1 * | 5/2003 | Hansen et al. | 340/980 |
| 6,597,294 B1 * | 7/2003 | Ariens | 340/995.26 |
| 6,690,299 B1 * | 2/2004 | Suiter | 340/973 |
| 6,828,922 B1 * | 12/2004 | Gremmert et al. | 340/949 |
| 6,927,782 B2 | 8/2005 | Coldefy et al. | |
| 7,010,398 B2 * | 3/2006 | Wilkins et al. | 701/3 |
| 7,124,000 B2 * | 10/2006 | Horvath et al. | 701/3 |
| 7,177,731 B2 * | 2/2007 | Sandell et al. | 701/3 |
| 7,222,017 B2 * | 5/2007 | Clark et al. | 701/120 |
| 2002/0008640 A1 * | 1/2002 | Horvath et al. | 340/945 |
| 2003/0003872 A1 * | 1/2003 | Brinkley et al. | 455/66 |
| 2003/0016158 A1 * | 1/2003 | Stayton et al. | 342/29 |
| 2003/0193410 A1 * | 10/2003 | Chen et al. | 340/971 |
| 2003/0222887 A1 * | 12/2003 | Wilkins et al. | 345/618 |
| 2004/0015274 A1 * | 1/2004 | Wilkins et al. | 701/3 |
| 2005/0024237 A1 * | 2/2005 | Gannett | 340/967 |
| 2005/0026609 A1 * | 2/2005 | Brinkley et al. | 455/431 |
| 2005/0065671 A1 * | 3/2005 | Horvath et al. | 701/3 |
| 2006/0077092 A1 * | 4/2006 | Gilliland et al. | 342/26 B |
| 2006/0250280 A1 * | 11/2006 | Chen et al. | 340/974 |
| 2007/0027589 A1 * | 2/2007 | Brinkley et al. | 701/3 |
| 2007/0168111 A1 * | 7/2007 | Dubourg | 701/120 |
| 2007/0179684 A1 * | 8/2007 | He | 701/3 |
| 2007/0260364 A1 * | 11/2007 | Dwyer | 701/3 |
| 2007/0299597 A1 * | 12/2007 | Fetzmann et al. | 701/120 |
| 2008/0022217 A1 * | 1/2008 | Aspen | 715/764 |
| 2009/0231163 A1 * | 9/2009 | He | 340/946 |

* cited by examiner

METHODS AND SYSTEMS FOR DISPLAYING ELECTRONIC ENROUTE MAPS

BACKGROUND OF THE INVENTION

This invention relates generally to aircraft cockpit displays and more particularly, to methods and systems for displaying maps on aircraft cockpit displays.

At least some known aircraft include cockpit displays that are controlled by an information system such as an electronic flight bag (EFB). The electronic flight bag is a relatively new feature for managing information in an aircraft. A traditional paper-based flight bag may provide access, in paper form to such aids as enroute charts, departure procedures, engine out procedures, standard terminal arrivals (STARS), approach plates, taxi diagrams, extended twin engine operations (ETOPS) and oceanic navigational logs, and planning charts. The flight bag also generally includes operations manual, flight manual, MEL/CDL, fault reporting manual, performance data, checklists, and operations specifications. Electronic flight bags may also be configured to display electronic en-route maps (EEM) for situational awareness purposes. Such maps, located on the flight are not approved for primary navigation purposes, but having an own ship depiction displayed on a map may be misused as a primary navigation display. To remedy the problem of such use, EMMs with permanent own ship depiction may not be granted operational approval by the regulatory authorities. The depiction of an own ship symbol on a map is seen as a type C application. However, a transition from paper charts requires that the currently accessible paper based operational cockpit procedures be built into the newly added electronic flight bag functionality including an EEM approved for use on the flight deck.

BRIEF DESCRIPTION OF THE INVENTION

In one embodiment, a position indicating display system for an aircraft includes a map display unit configured to display a map representative of an area being traversed by the aircraft, and an overlay comprising an own ship depiction, said overlay displayed on the map for a period of time in response to an input from at least one of a user and an aircraft sensor.

In another embodiment, a method of displaying a current position of an aircraft includes determining a current position of the aircraft, displaying a map of an area of earth surface surrounding the determined current position of the aircraft, and displaying an own ship depiction of the current position of the aircraft on the displayed map in response to an input from a user.

In yet another embodiment, an electronic flight bag system for an aircraft includes a database onboard the aircraft wherein the database includes digital map data. The system includes an aircraft position receiver for identifying an in flight position of the aircraft, a display unit onboard the aircraft configured to display a digital map, and a processor onboard the aircraft communicably linked to the database, the aircraft position receiver, and the display unit. The processor is configured to generate the digital map on the display unit from the digital map data and determine a position of the aircraft relative to the generated map. An input device is used for causing an own ship depiction of the aircraft to be displayed on the digital map at the determined position in response to an input from the input device.

DETAILED DESCRIPTION OF THE INVENTION

Figure 1:
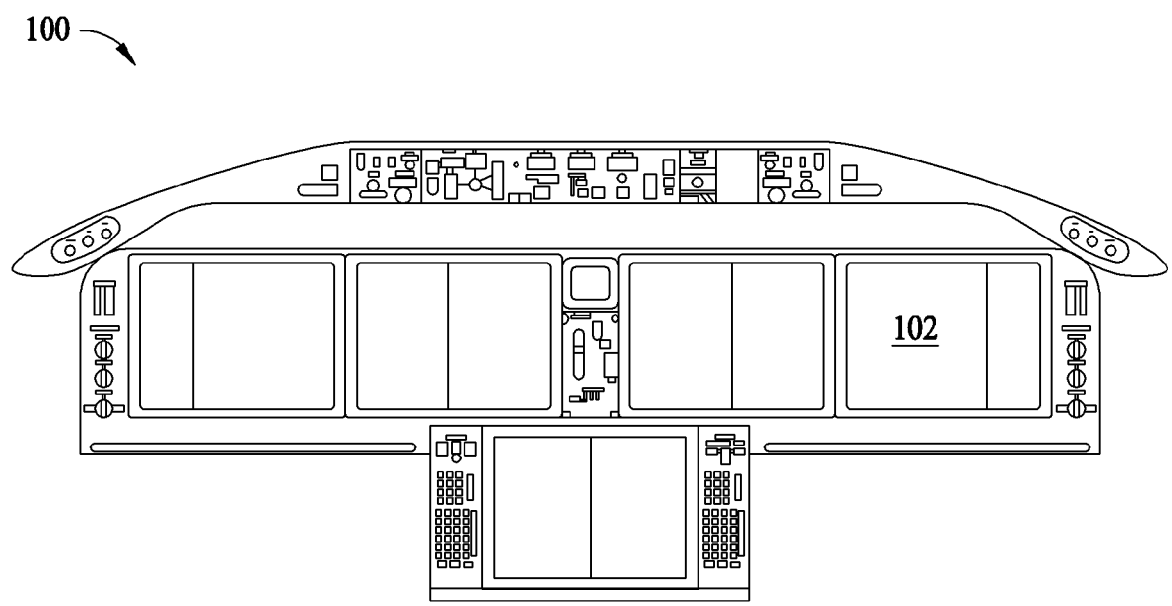
FIG. 1 is a forward perspective view of an exemplary aircraft cockpit display panel that includes at least one display screen in accordance with an embodiment of the present invention.

FIG. 1 is a forward perspective view of an exemplary aircraft cockpit display panel 100 that includes at least one display screen 102 in accordance with an embodiment of the present invention. In the exemplary embodiment, display screen 102 is positioned on aircraft cockpit display panel 100. In an alternative embodiment, display screen 102 is positioned on an auxiliary panel (not shown) located in the cockpit of the aircraft. During aircraft operation, display screen 102 is available for viewing by a pilot and/or co-pilot of the aircraft. Display screen 102 may be used to view data included in an electronic flight bag (not shown), which may be embodied as a standalone device such as, but not limited to a PDA or laptop PC, or as a software component of a system executing on a processor that is part of a subsystem of the aircraft. In the exemplary embodiment, the electronic flight bag includes an electronic storage device configured to store various user-configurable flight-related objects for all required and desired information for a particular flight, such as flight routes, as defined by way-points, airport information, temporary flight restrictions, and weather information as well as any other user-defined objects associated with a flight, ground operations, and/or flight planning. The electronic flight bag receives data from various aircraft and ground sensors and systems, determines flight information based on the received data in real-time, and displays the flight information and/or alerts the flight crew through display screen 102 and other aural and/or visual indicators positioned on cockpit display panel 100. Such flight information provides the flight crew with additional situational awareness during all phases of aircraft operation.

Figure 2:
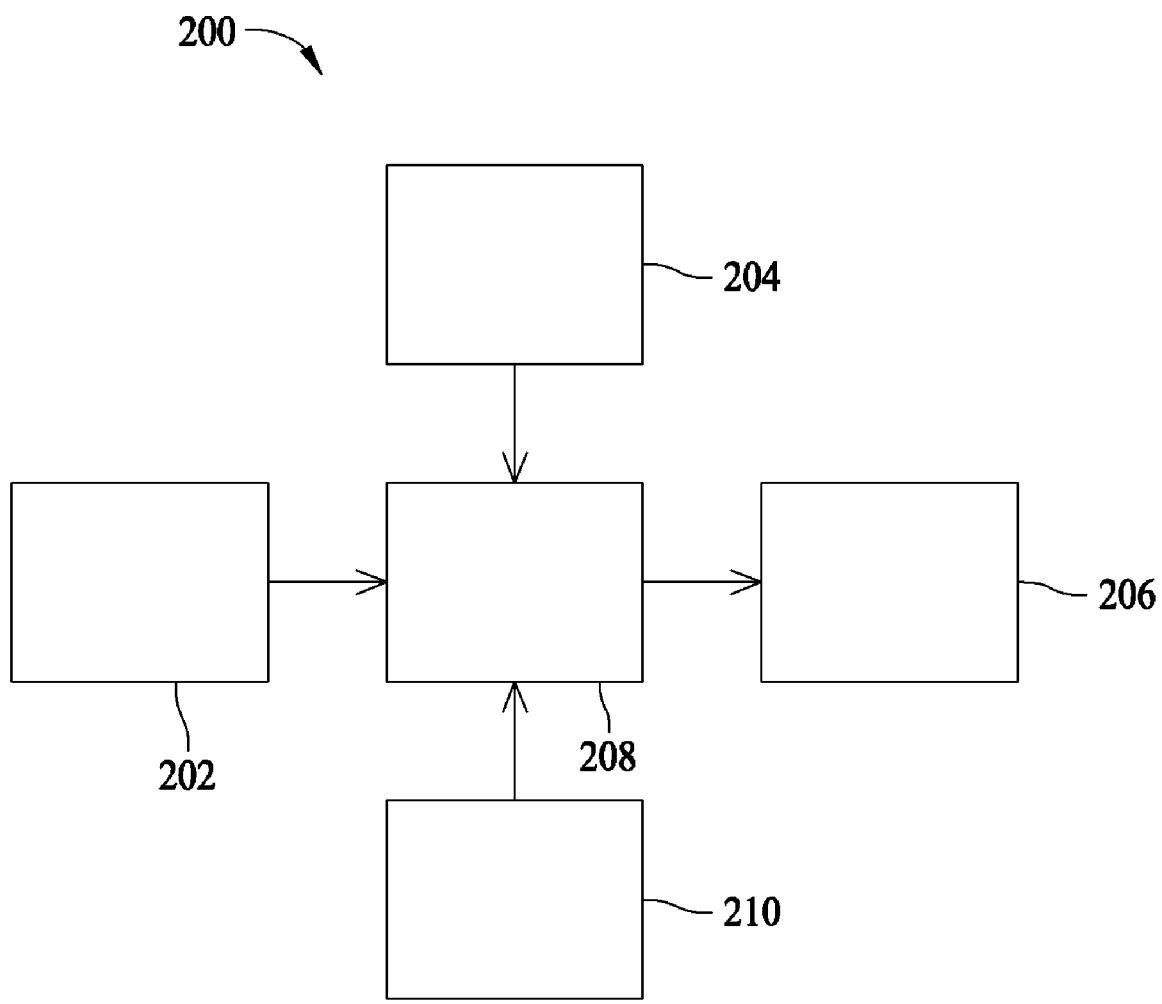
FIG. 2 is a schematic view of an exemplary embodiment of a position indicating display system for an aircraft.

FIG. 2 is a schematic view of an exemplary embodiment of a position indicating display system 200 for an aircraft. Display system 200 includes a database 202 that includes digital map data, an aircraft position receiver 204 for identifying an in flight position of the aircraft, and a display unit 206 configured to display a digital map. Display system 200 also includes a processor 208 communicatively coupled to database 202, aircraft position receiver 204, and display unit 206. Processor 208 is configured to generate the digital map on display unit 206 from the digital map data and determine a position of the aircraft relative to the generated map. Display system 200 further includes an input device 210 for causing an own ship depiction of the aircraft to be displayed on the digital map at the determined position in response to an input from input device 210.

Display unit 206 is configured to display a map representative of an area being traversed by the aircraft and an overlay of an own ship depiction that is displayed on the map for a period of time in response to an input from at least one of a user and an aircraft sensor through input device 210. Displaying the own ship depiction on the map for only a time of time rather than continuously is intended to allow elimination of paper enroute maps on the flight deck while permitting approval by the regulatory authorities as a type B application. The displayed map may be a moving map display and a static map display. In an embodiment, input device may include a weight-on-wheels (WOW) sensor, an own ship display switch, a touch screen, a switch that changes the display mode of display unit 206 or any other input capable of performing the functions described herein. For example, an input from a WOW sensor may be used to cause the own ship depiction to be displayed continuously while a WOW signal is true. The WOW signal comprises a true/false indication of whether or not weight on the main landing gear is above or below a predetermined weight consistent with the aircraft resting on the ground. Accordingly, the own ship depiction is available for continuous viewing when the aircraft is on the ground. To display the own ship depiction in-flight, the flight crew can provide a direct input that turns on the own ship depiction. The direct input may be for example, but not limited to a pushbutton specific for performing that action. The flight crew may provide a direct input to turn on the own ship depiction, such as switching a display mode on display unit 206. For example, to aid the flight crew in situational awareness, the own ship depiction may be turned on when the map display is zoomed in or zoomed out, when the map display is changed between a track-up and a north-up display mode. Additionally, the own ship depiction may be turned on when the map display is changed between a rose view and an arc view display.

After the own ship depiction is displayed for a predetermined period of time, the own ship depiction is removed from being displayed on the map. In the exemplary embodiment, the own ship depiction is alpha-blended into the background such that the own ship depiction is a transparent overlay that is not visible to the user. In an alternative embodiment, the own ship depiction is completely removed from any display. The own ship depiction is displayed for a period of time selectable by a user/operator, which may be for the user's preference and/or to comply with a regulatory directive.

Display unit 206 is configured to display the map in a north-up mode and a track-up mode. When in the north-up mode, the display orients the map such that the cardinal direction "north" is aligned with the top of the display. The own ship depiction will be oriented on the map according to the heading or track of the aircraft. When in the track-up mode, the display orients the map such that the aircraft heading or track is aligned with the top of the display. Switching between the north-up mode and the track-up mode may be used as an input that causes the own ship depiction to be displayed on the map. Displaying the own ship depiction each time the display is switched between the north-up mode and the track-up mode provides the flight crew with a situational awareness update.

Display unit 206 is configured to display the map in a rose view and an arc view. This Rose/Arc view control allows the user to change the centering of the map display format from own-ship being located at the center of the display (full rose view), to own-ship being located at the bottom center of the screen (arc view).

Figure 3:
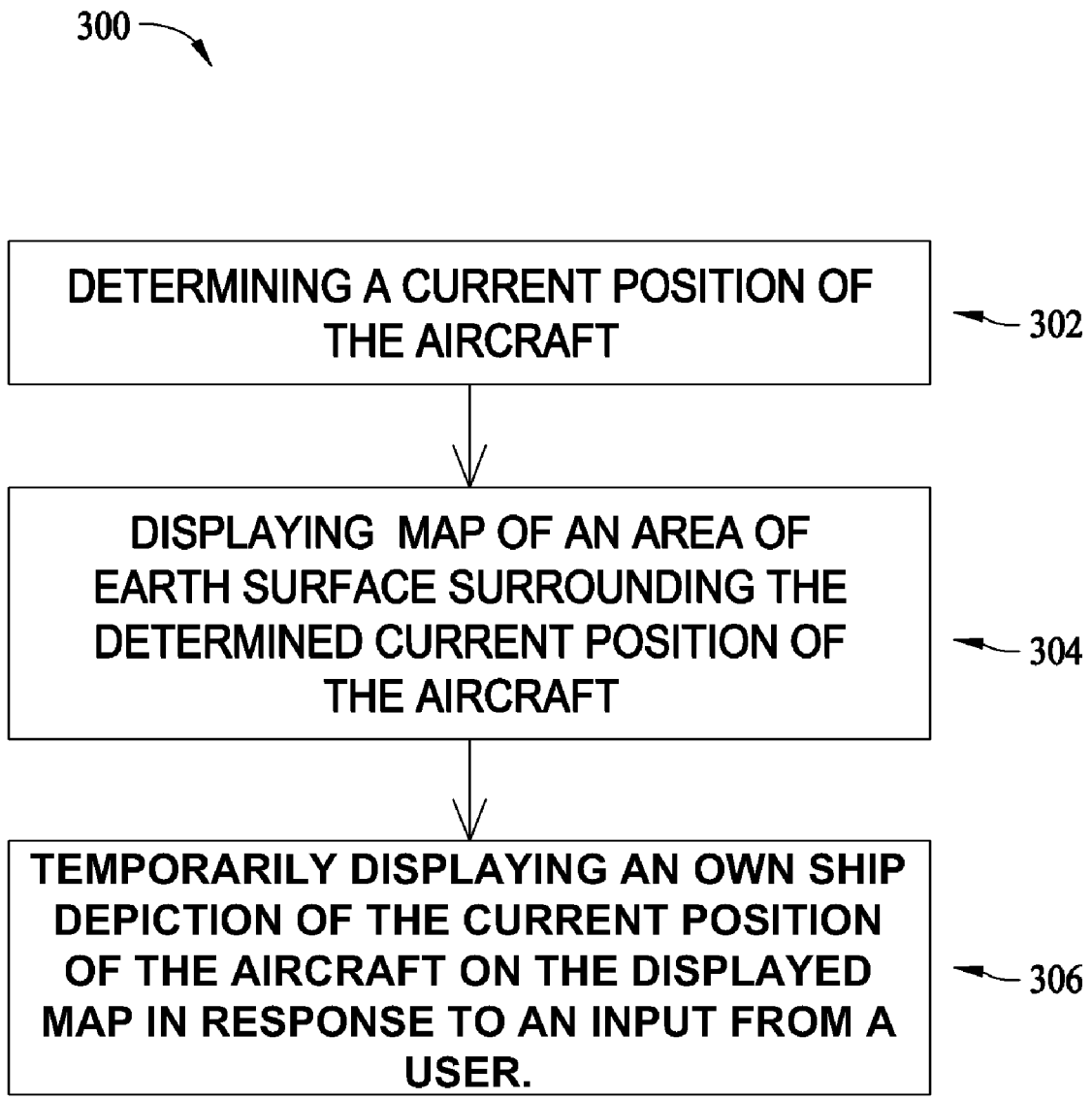
FIG. 3 is a flow chart of an exemplary method of displaying a current position of an aircraft.

FIG. 3 is a flow chart of an exemplary method 300 of displaying a current position of an aircraft. Method 300 includes determining 302 a current position of the aircraft, displaying 304 a map of an area of earth surface surrounding the determined current position of the aircraft, and displaying 306 an own ship depiction of the current position of the aircraft on the displayed map in response to an input from a user. The map may be displayed in a north-up, a track-up, or other orientation and the area of earth surface depicted by the map is selectable by a user. In the exemplary embodiment, the own ship depiction is displayed for a period of time selectable by a user/operator and at the expiration of the selected time delay, the own ship depiction is no longer displayed. To display the own ship depiction again, the user initiates another input. The time delay may be based on a user/operator preference, a regulatory directive, or other instruction.

User actions that may provide an input to display the own ship depiction include but are not limited to switching between the north-up mode and the track-up mode, switching between a rose view and an arc view, actuating an input dedicated to providing an own ship depiction display input by for example, a pushbutton, audible, or a touch screen based input. The own ship depiction may be displayed continuously when a weight-on-wheels (WOW) signal is true and may be displayed on a moving map display and a static map display.

The above-described methods and systems for displaying a current position of an aircraft using an electronic enroute map are cost-effective and highly reliable. The own ship depiction is displayed for a limited time period after initiation by a user to prevent the user from using the electronic enroute map for primary navigation. The method facilitates situational awareness in a cost-effective and reliable manner.

While the invention has been described in terms of various specific embodiments, those skilled in the art will recognize that the invention can be practiced with modification within the spirit and scope of the claims.

What is claimed is:

1. A position indicating display system for an aircraft comprising:
   a map display unit configured to display a map representative of an area being traversed by the aircraft; and
   an overlay comprising an own ship depiction, said overlay displayed on the map for a temporary period of time in response to an input from at least one of a user and an aircraft sensor to provide in route positional awareness; and
   said position indicating display system contained within an electronic flight bag and configured to display the own ship depiction for only a temporary period of time at least upon switching between a north-up mode and a track-up mode and between a rose view and an arc view, the temporary period of time based on at least one of a user selection, a user preference, and a regulatory directive.

2. A system in accordance with claim 1 wherein said overlay is removed from the display after the period of time.

3. A system in accordance with claim 1 wherein said overlay is displayed when a weight-on-wheels (WOW) signal is true.

4. A system in accordance with claim 3 wherein the WOW signal comprises a true/false indication of whether or not weight on the main landing gear is above or below a predetermined weight consistent with the aircraft resting on the ground.

5. A system in accordance with claim 1 wherein said map display is at least one of a moving map display and a static map display.

6. A system according to claim 1 wherein the electronic flight bag includes a database of digital map data, the database communicatively coupled to said position indicating system.

7. A system in accordance with claim 1 further comprising an aircraft position receiver operable to identify an in flight position of an aircraft and provide the in flight position to said position indicating display system.

8. A system in accordance with claim 7 further comprising a database of digital map data operable for display on said map display unit, said system operable to generate the digital map on said position indicating display system from the digital map data and determine and display a position of the aircraft relative to the generated map on said position indicating display system.

9. A method of displaying a current position of an aircraft comprising:

determining a current position of the aircraft;

displaying, on a position indicating display system contained within an electronic flight bag, a map of an area of earth surface surrounding the determined current position of the aircraft; and temporarily displaying an own ship depiction of the current position of the aircraft on the displayed map, providing in route positional awareness, in response to an input from a user, a length of the temporary display based on at least one of a period of time selectable by a user, a user preference, and a regulatory directive;

wherein said input from a user comprises at least switching between a north-up mode and a track-up mode and switching between a rose view and an arc view.

10. A method in accordance with claim 9 wherein displaying a map of an area of earth surface comprises displaying a map of an area of earth surface wherein a size of the area is selectable by a user.

11. A method in accordance with claim 9 wherein displaying an own ship depiction further comprises removing the own ship depiction from the display after the period of time.

12. A method in accordance with claim 9 wherein displaying an own ship depiction comprises displaying an own ship depiction when a weight-on-wheels (WOW) signal is true.

13. A method in accordance with claim 9 wherein displaying a map comprises displaying at least one of a moving map display and a static map display.

* * * * *